United States Patent [19]
Nakamura et al.

[11] Patent Number: 6,077,368
[45] Date of Patent: Jun. 20, 2000

[54] EYEGLASS FRAME AND FABRICATION METHOD

[75] Inventors: Masayuki Nakamura, Yokohama; Mikio Takeuchi, Fukui-ken, both of Japan

[73] Assignee: Furukawa Electric Co., Ltd., Japan

[21] Appl. No.: 09/312,800

[22] Filed: May 17, 1999

Related U.S. Application Data

[63] Continuation of application No. 08/609,015, Feb. 29, 1996, abandoned, which is a continuation of application No. 08/123,350, Sep. 17, 1993, abandoned.

[51] Int. Cl.[7] .................................................. C22F 1/10
[52] U.S. Cl. .......................... 148/563; 148/564; 351/41; 351/106
[58] Field of Search ................................. 148/563, 564; 351/41, 106

[56] References Cited

U.S. PATENT DOCUMENTS

| | | | |
|---|---|---|---|
| 4,502,896 | 3/1985 | Duerig et al. | 148/563 |
| 4,707,196 | 11/1987 | Honma et al. | 148/563 |
| 4,896,955 | 1/1990 | Zider et al. | 351/41 |
| 4,935,068 | 6/1990 | Duerig | 148/563 |

*Primary Examiner*—Scott Kastler
*Attorney, Agent, or Firm*—Morrison Law Firm

[57] ABSTRACT

A Ni—Ti superelastic alloy demonstrates superelastic properties at normal temperatures from about 0 and 30° C. The superelastic alloy allows shape alteration when the temperature is in excess of 40° C. The Ni—Ti superelastic alloy is produced by plastic working a composition containing essentially Ni and Ti, and subjecting the composition to heat treatment at a temperature between 600 and 800° C. to impart shape memory. When the Ni—Ti superelastic alloy is used in an eyeglass frame, it allows the shape of the pad arms to be adjusted at temperatures above about 40° C.

14 Claims, 3 Drawing Sheets

EYEGLASS FRAME AND FABRICATION METHOD

This application is a continuation of U.S. application Ser. No. 08/609,015, filed Feb. 29, 1996, now abandoned, which is a continuation of U.S. application Ser. No. 08/123,350, filed Sep. 17, 1993, now abandoned.

BACKGROUND OF THE INVENTION

This invention relates to an eyeglass frame, and more particularly, an eyeglass frame in which a pad arm produced from a superelastic alloy such as Ni—Ti superelastic alloy, is adjustable to conform to the user's face. A method is disclosed for producing a Ni—Ti superelastic alloy and eyeglass frame.

In general, articles produced from a superelastic alloy such as Ni—Ti superelastic alloy, have the benefit of superelastic properties when stress applied to the articles produces strain. Because of stress-induced martensitic transformation, the articles return virtually to their original shape following removal of the applied stress, even when there is a large deformation beyond the yielding point.

Stress-strain characteristics of an alloy depend upon the conditions of heat treatment following cold work. These characteristics can be represented by stress-strain charts. For example, referring to FIGS. 1a and 1b, the two charts illustrate characteristics of alloys subjected to heat treatment in the temperature ranges of 400–500° C. and 200–350° C., respectively.

Various uses for such superelastic alloys have been described in the prior art, as well as methods of production. Among such items are eyeglass frames, and their component elements. For example, U.S. Pat. No. 4,772,112 and U.S. Pat. No. 4,896,955 both disclose methods of producing a bridge, a temple, and a pad arm to support a nose pad of an eyeglass frame. The superelastic alloy in the prior art is produced from a Ni—Ti alloy by plastic working with a working rate of at least 30%. This is followed by heat treatment for more than one hour at a temperature of less than 400° C. The alloy produced demonstrates superelastic characteristics over a broader temperature range that of this invention, ie. from –20 to 80° C.

Each of the various parts of an eyeglass frame, particularly a pad arm, requires adjustment to properly conform to the user's face. However, the prior-art pad arm, as disclosed in the previously referenced patents, is difficult to adjust because of its broad temperature range of superelasticity. For example, a pad arm deformed at a temperature of 100° C. to produce about 4% strain, returns to its original shape upon relieving the applied stress. Strain in excess of 10% is required to alter the shape as desired. This degree of strain may cause not only the pad arm to break, but also the eyeglass frame itself and the joint portion between the eyeglass frame and the pad arm.

OBJECTS AND SUMMARY OF THE INVENTION

Accordingly, it is an object of the invention to provide an eyeglass frame which overcomes the drawbacks of the prior art, and a method for producing the Ni—Ti superelastic alloy and eyeglass frame.

It is a further object of the invention to provide an eyeglass frame which will return to its original shape in the temperature range of 0–30° C., and a method of production.

It is a still further object of the invention to provide an eyeglass frame in which the shape thereof can be changed as desired in the temperature range of 40–80° C., preferably, 50–70° C., and a method of production.

Briefly stated, a Ni—Ti superelastic alloy demonstrates superelastic properties at normal temperatures from about 0 and 30° C. The superelastic alloy allows shape alteration when the temperature is in excess of 40° C. The Ni—Ti superelastic alloy is produced by plastic working a composition containing essentially Ni and Ti, and subjecting the composition to heat treatment at a temperature between 600 and 800° C. to impart shape memory. When the Ni—Ti superelastic alloy is used in an eyeglass frame, it allows the shape of the pad arms to be adjusted at temperatures above about 40° C.

According to an embodiment of the invention, there is provided a method of producing a Ni—Ti superelastic alloy, comprising: plastic working a composition consisting essentially of Ni and Ti, and heat treating the composition at a temperature between about 600–800° C.

According to a feature of the invention, there is provided a Ni—Ti superelastic alloy made by the steps of plastic working a composition consisting essentially of Ni and Ti, and heat treating the composition at a temperature between about 600–800° C.

According to a further feature of the invention, there is provided an eyeglass frame, comprising; a pair of nose pad arms, each of the nose pad arms having a nose pad at a first end thereof, each of the nose pad arms being connected to a remainder of the eyeglass frame at a second end thereof, the nose pad arms being made of a superelastic metal alloy, the superelastic metal alloy having a recoverable strain of more than 1.5% measured on the release of a stress which has caused 2.0% deformation strain thereto in the temperature range at least between 0 and 30° C., and the superelastic metal alloy having a recoverable strain of less than 1% measured on the release of a stress which has caused 2.0% deformation strain thereto at a temperature not less than 40° C.

According to a still further feature of the invention, there is provided a nose pad arm for an eyeglass frame, comprising; the nose pad arm being made of a superelastic metal alloy, the superelastic metal alloy having a recoverable strain of more than 1.5% measured on the release of a stress which has caused 2.0% deformation strain thereto in the temperature range at least between 0 and 30° C., and the superelastic metal alloy having a recoverable strain of less than 1% measured on the release of a stress which has caused 2.0% deformation strain thereto at a temperature not less than 40° C.

According to a still further feature of the invention, there is provided a nose pad arm for an eyeglass frame, made of a Ni—Ti superelastic alloy made by the steps of; plastic working a composition consisting essentially of Ni and Ti, and heat treating the composition at a temperature between about 600–800° C.

According to a still further feature of the invention, there is provided a method of shape adjustment for an article made of Ni—Ti superelastic alloy having a recoverable strain of more than 1.5% measured on the release of a stress which has caused 2.0% deformation strain thereto in the temperature range at least between 0 and 30° C., and having a recoverable strain of less than 1% measured on the release of a stress which has caused 2.0% deformation strain thereto at a temperature not less than 40° C., the method comprising; heating the article to a heat treatment temperature no lower than 40° C. while holding a desired shape of the article, and cooling the article to below the heat treatment temperature while maintaining the desired shape.

According to a still further feature of the invention, there is provided an article, comprising; the article being made of a superelastic metal alloy, said superelastic metal alloy having a recoverable strain of more than 1.5% measured on the release of a stress which has caused 2.0% deformation strain thereto in the temperature range at least between 0 and 30° C., and said superelastic metal alloy having a recoverable strain of less than 1% measured on the release of a stress which has caused 2.0% deformation strain thereto at a temperature not less than 40° C.

The above and other objects and advantages of the present invention will become apparent from the following description read in conjunction with the accompanying drawings, in which like reference numerals designate the same element.

DETAILED DESCRIPTION OF THE PREFERRED EMBODIMENT

Figure 1A:
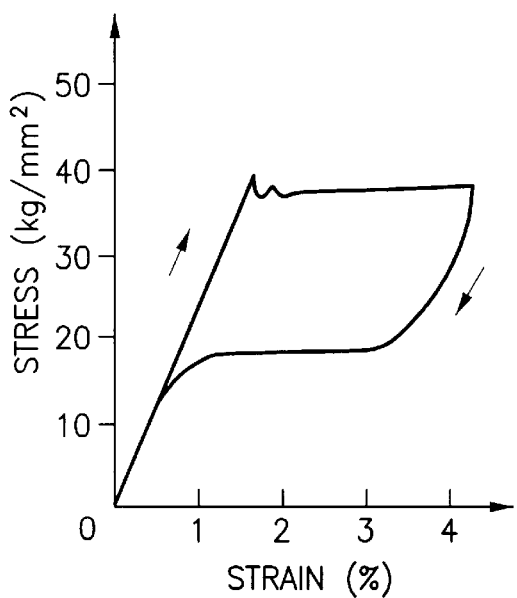
FIG. 1a is a chart showing the relationship between strain and stress on a Ni—Ti superelastic alloy processed by heat treatment at 400–500° C. following plastic working.
Figure 1B:
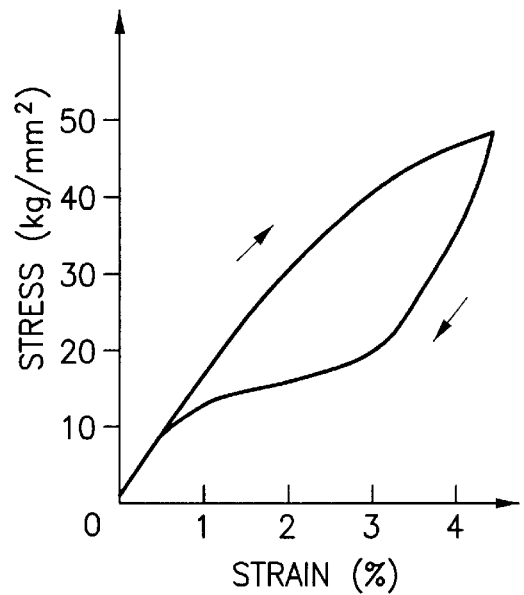
FIG. 1b is a chart showing the relationship between strain and stress on a Ni—Ti superelastic alloy processed by heat treatment at 200–350° C. following plastic working.
Figure 2:
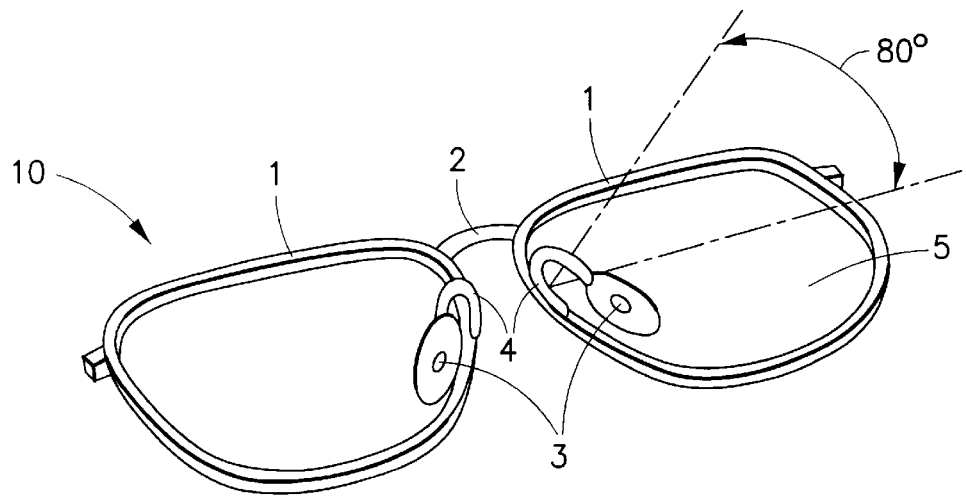
FIG. 2 is a schematic view of a portion of an eyeglass frame.

Referring to FIG. 2, an eyeglass frame is shown, generally designated 10. A generally U-shaped pad arm 4 is connected at one end to each of a pair of rims 1 at an angle of 80° with respect to a lens 5. Rims 1 are connected to each other by bridge 4. A nose pad 3 is connected to the other end of pad arm 4 resulting in eyeglass frame 10 of this invention.

Pad arm 4 of this invention, produced from Ni—Ti superelastic alloy, has a recoverable strain of more than 1.5% upon relieving a stress producing a strain of 2% at temperatures ranging from at least 0–30° C. This means that pad arm 4 returns to its original shape with less than 0.5% remaining strain. In contrast, when the same degree of strain is generated at temperatures in excess of 40° C., the pad arm does not fully recover from the strain. Rather, there is more than 1% remaining strain after the stress is relieved. In short, when stress is applied in the range of 0–30° C., pad arm 4 temporarily adjusts to the user's face during use, and returns to its original shape when the glasses are removed. However, the shape of pad arm 4 is easily changed by heating to a temperature over 40° C., for example, by a fan heater. Thus, this invention demonstrates the same beneficial superelastic characteristics as the prior art in the range of normal temperatures, but at the same time provides the advantage of shape alteration at elevated temperatures less than those required by the prior art alloy.

To specify the characteristic of Ni—Ti superelastic alloy, 2% strain is often used as a test value, since the strain experienced during normal use is typically less than 2% strain.

Superelastic Ni—Ti alloy is produced from 50–52 at % (atomic %) Ni and 50–48 at % Ti. Some Ni—Ti alloys may replace up to 10% of Ni and/or Ti with such metals as Fe, Cr, V, Co, Al, Cu, Nd, Pd, Mo and Be. The following are examples of typical compositions (shown in atomic percentages):

Ni 51.0—Ti 49.0,
Ni 50.6—Ti 48.9—V 0.5,
Ni 49.8—Ti 48.2—Co 2.0,
Ni 49.6—Ti 49.6—Fe 0.8,
Ni 50.5—Ti 49.1—Cr 0.4, and
Ni 41.7—Ti 50.0—Cu 8.0—Cr 0.3

Pad arm 4 of this invention is produced by the following process. Ni—Ti alloy having a composition as described above is disposed in plastic working, including the processes of drawing, rolling and pressing. Working rate of the plastic working is not limited in the present invention but is usually between about 10 to about 40%. Consequently, a wire-rod shape is formed having predetermined dimensions. Such a wire-rod material may a cylindrical shape with a diameter of 0.5–1.5 mm, a cross-sectional rectangular shape with sides of 0.5–1.5 mm, a cross-sectional ellipsoidal shape of similar dimension, or a combination of the aforementioned shapes. Pad arm 4 is then molded and subjected to heat treatment to impart shape memory, and attached to eyeglass frame 10. Pad arm 4 is molded in a generally U-shape, J-shape or S-shape. Bending further defines the shape of the pad arm. The heat treatment is performed at a temperature in the range of 600–800° C. to impart the shape memory for a predetermined shape and shape adjustability at low temperatures of 40 to 80° C. for later shape adjustment as displayed by the Ni—Ti alloy according to the present invention.

A temperature of 600–800° C. is required to achieve the desired results. When the alloy is exposed to less than 600° during heat treatment, a work-hardened structure remains in the wire-rod material after working. As a result, bending work will not alter the shape of the wire-rod even at temperatures well in excess of 40° C. The deformed shape returns to the original shape upon relief of the applied stress. If the temperature during heat treatment is in excess of 800° C., large-sized crystal particles are formed in the wire-rod material, making the pad arm very brittle.

Although the duration of the heat treatment is not critical, when pad arm 4 is attached to an article having a high heat capacity, it is preferable to subject the article to heat treatment for a period of a few seconds to one hour or more. This permits pad arm 4 to be heated to ambient temperature. When electric current and electric high frequency heating are utilized to heat pad arm 4, it may be possible to complete heat treatment in as short a time as five seconds.

The heat treatment can be done after, or at the same time, as molding of pad arm 4. In addition, bending work and heat treatment can also be performed at the same time.

After heat treatment, one end of pad arm 4 is joined to eyeglass frame 10, while nose pad 3 is attached at the other end. Pad arm 4 is ordinarily connected to lens rim 1. However, when there is no lens rim 1, pad arm 4 may be connected to bridge 2 coupling a left side with a right side. Various methods of attaching pad arm 4 include soldering, brazing, sleeve chucking and fixing with a shaft.

Alteration of the shape of pad arm 4 of eyeglass frame 10 should be accomplished at as low a temperature as possible above normal temperatures. If this temperature is too high, other materials from which eyeglass frame 10 was fabricated, such as nose pad 3 or an ear hock of a temple made from plastic or rubber, or a plastic lens, may be deformed, melted or cracked. Therefore, a temperature range of 40–80° C., preferably 50–70° C., is used.

It is possible to change the shape of pad arm 4 into a new desired shape by using a hot air heater. After achieving the new shape, superelastic characteristics are still demonstrated at normal temperatures between 0 and 30° C. When applied stress at these temperatures is relieved, pad arm 4 returns to the new shape.

To confirm the superelastic characteristic of the wire-rod material used for pad arm 4 of this invention, the following experiments were performed.

EXAMPLE 1

In this experiment, sample A having a component ratio of 51.0 at % Ni and 49.0 at % Ti was utilized.

First, sample A was processed in 30% plastic work to produce a wire-rod material with a cross-sectional diameter of 1.2 mm. The material was then exposed to heat treatment at a temperature of 730° C. for 10 minutes, while being held in a straight line to impart shape memory to the straight line.

Figure 3A:
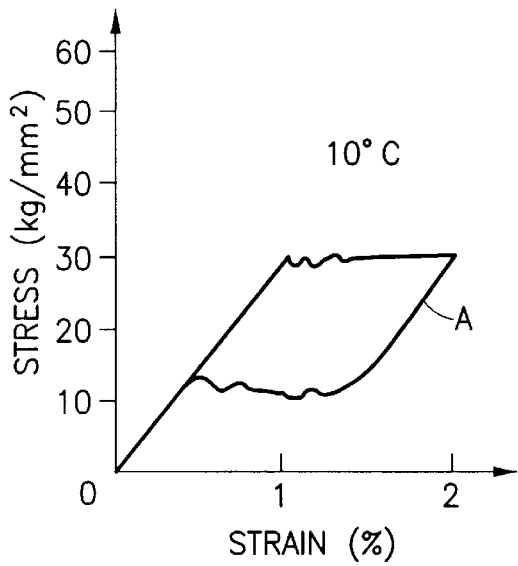
FIG. 3a is a chart showing the relationship between strain and stress on a Ni—Ti superelastic wire rod for a pad arm at a temperature of 10° C. in an embodiment of this invention.

At a temperature of 10° C., stress was applied to sample A sufficient to generate 2% strain. When the stress was relieved, sample A returned to its original shape, showing a high degree of recoverable strain, as illustrated by FIG. 3a.

Figure 3B:
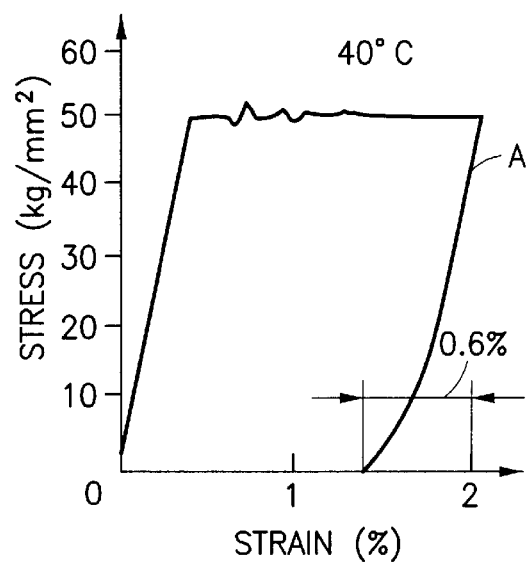
FIG. 3b is a chart showing the relationship between strain and stress on a Ni—Ti superelastic wire rod for a pad arm at a temperature of 40° C. in the embodiment of this invention.

In contrast, when the same operation was performed at 40° C., sample A did not return to its original shape, as illustrated by FIG. 3b. Rather, when the stress was relieved, sample A at 40° C. demonstrated elasticity of only 0.6% out of the total 2% strain. This indicates that the shape of an article may be easily adjusted at this elevated temperature.

Comparison 1.

Figure 4A:
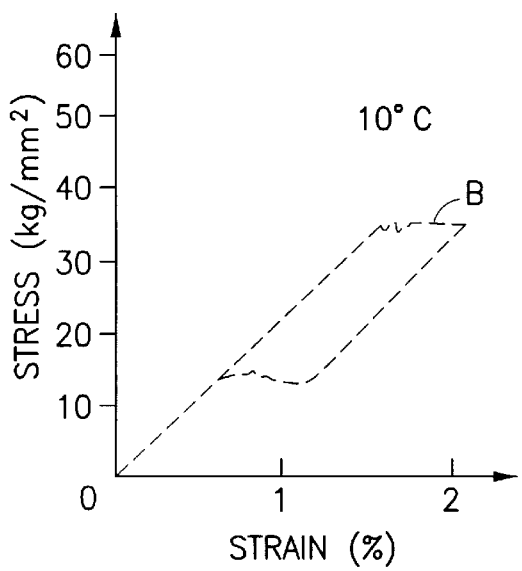
FIG. 4a is a chart showing the relationship between strain and stress on a Ni—Ti superelastic wire rod for a pad arm at a temperature of 10° C. in a superelastic alloy of the prior art.
Figure 4B:
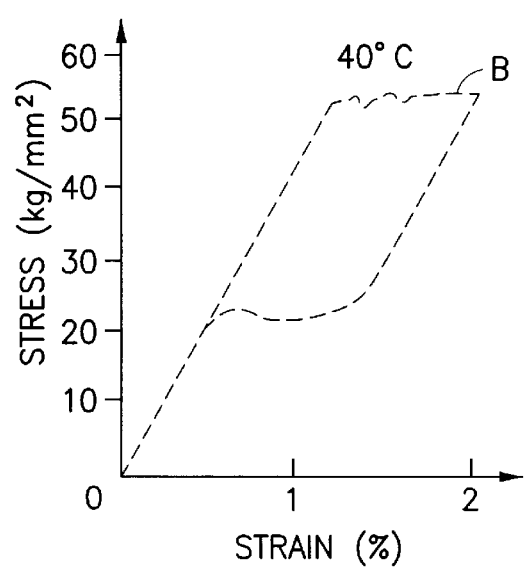
FIG. 4b is a chart showing the relationship between strain and stress on a Ni—Ti superelastic wire rod for a pad arm at a temperature of 40° C. in a superelastic alloy of the prior art.

Sample B composed of the prior art alloy was produced under the same conditions as sample A except that heat treatment was performed at 500° C. Sample B returned to its original shape following generation of 2% strain, both at temperatures of 10° C. and 40° C. The results are shown in FIGS. 4a and 4b, respectively.

Comparison 2.

Sample C was produced under the following conditions. Sample C, a Ni—Ti alloy having a composition of 51.0 at % Ni and 49.0 at % Ti, was disposed in 30% plastic work. A wire-rod material was produced with a cross-sectional diameter of 1.2 mm and a length of 150 mm. The wire rod was further subjected to heat treatment at a temperature of 300° C. for 60 minutes, to impart superelastic properties.

Figure 5A:
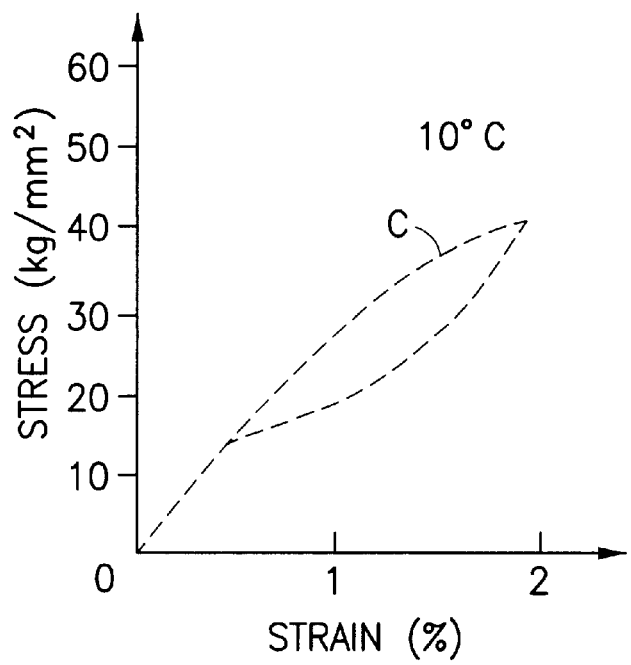
FIG. 5a is a chart showing the relationship between strain and stress on a Ni—Ti superelastic wire rod for a pad arm at a temperature of 10° C. in a superelastic alloy of the prior art.
Figure 5B:
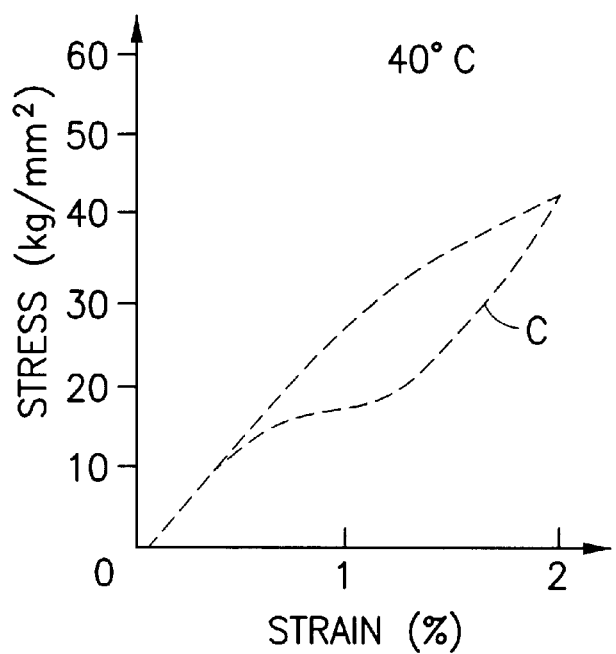
FIG. 5b is a chart showing the relationship between strain and stress on a Ni—Ti superelastic wire rod for a pad arm at a temperature of 40° C. in a superelastic alloy of the prior art.

Sample C returned to its original shape after 2% strain was generated, at temperatures of both 10° C. and 40° C. The results are shown in FIGS. 5a and 5b, respectively.

EXAMPLE 2

Referring again to FIG. 2, nose pad 3 was deformed down to an angle of 0° with respect to lens 5 at a temperature of 25° C. When the stress was relieved, nose pad 3 returned to the original position. Superelastic characteristics of this invention have been established at normal temperatures. In contrast, nose pad 3 heated to 45–60° C. by a hot air heater, returned to its original shape only at the angle of 10° with respect to lens 5. The position of nose pad 3 was easily adjusted to one having an angle of 10° at the temperatures between 45 and 60° C. After the change, nose pad 3 was further deformed up to the angle of 90° with respect to lens 5 at 20° C. Upon relief of the stress nose pad 3 returned to the 10° angle. After this was repeated 100 times at 20° C., nose pad 3 continued to return to the same 10° angle.

As described above, the eyeglass frame of this invention fits to the user's face within a range of normal temperatures. However when necessary, the shape of the eyeglass frame may be easily adjusted at a temperature in excess of 40° C. After adjustment, the eyeglass frame continues to demonstrate superelastic characteristics with regard to the new shape.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. A process for making a Ni—Ti superelastic alloy comprising:

alloying a metal composition including from about 50 to 52 atomic % Ni and from about 48 to 50 atomic % Ti;

plastic working said composition from about 10 to 40%; and heat treating said composition at a temperature between about 600 to 800° C. to yield said superelastic alloy;

said alloy having a recoverable strain of more than 1.5%, measured on the release of a stress which causes at least a 2.0% deformation strain of said alloy, at a temperature of between about 0 and 30° C.;

said alloy having a recoverable strain of less than 1.0%, measured on the release of a stress which causes at least a 2.0% deformation strain of said alloy, at a temperature greater than an elevated temperature, wherein said elevated temperatures is above about 40° C.

2. The process according to claim 1, wherein said process further comprises replacing at least one of Ni and Ti contents of said composition with less than 10% of at least one element selected from the group consisting of Fe, Cr, V, Co, Al, Cu, Nd, Pd, Mo and Be.

3. A product made from an alloy produced by the process of claim 1.

4. A product made from an alloy produced by the process of claim 2.

5. An eyeglass frame comprising:

a pair of nose pad arms;

each of said nose pad arms having a first and a second end;

each of said nose pad arms connected at said first end to a nose pad;

each of said nose pad arms connected at said second end to an eyeglass frame member;

said nose pad arms made from an alloy produced by the process of claim 1.

6. An eyeglass frame comprising:

a pair of nose pad arms;

each of said nose pad arms having a first and a second end;

each of said nose pad arms connected at said first end to a nose pad;

each of said nose pad arms connected at said second end to an eyeglass frame member;

said pair of nose pad arms made from an alloy produced by the process of claim 2.

7. A nose pad arm for an eyeglass frame produced by the process of claim 1.

8. A nose pad arm for an eyeglass frame produced by the process of claim 2.

9. The nose pad arm according to claim 7, wherein said nose pad arm is a U-shape.

10. The nose pad arm according to claim 8, wherein said nose pad arm is a U-shape.

11. The nose pad arm according to claim 7, wherein said nose pad arm is a S-shape.

12. The nose pad arm according to claim 8, wherein said nose pad arm is a S-shape.

13. The nose pad arm according to claim 7, wherein said nose pad arm is a J-shape.

14. The nose pad arm according to claim 8, wherein said nose pad arm is a J-shape.

* * * * *

UNITED STATES PATENT AND TRADEMARK OFFICE
CERTIFICATE OF CORRECTION

PATENT NO.   : 6,077,368
DATED        : June 20, 2000
INVENTOR(S)  : Masayuki Nakamura and Mikio Takeuchi It is certified that error appears in the above-identified patent and that said Letters Patent is hereby corrected as shown below:

<u>Title page,</u>
Item [73], change "Furukawa Electric Co., Ltd., Japan" to -- The Furukawa Electric Co., Ltd.; Horikawa, Inc., both of Japan --

Signed and Sealed this

Twenty-third Day of April, 2002

*Attest:*

JAMES E. ROGAN
*Director of the United States Patent and Trademark Office*

*Attesting Officer*